United States Patent [19]
Birk

[11] Patent Number: 6,028,406
[45] Date of Patent: Feb. 22, 2000

[54] METHOD FOR COMMUTATING A BRUSHLESS MOTOR AND POWER SUPPLY FOR A BRUSHLESS MOTOR

[75] Inventor: Jens Birk, Sønderborg, Denmark

[73] Assignee: Danfoss A/S, Nordborg, Denmark

[21] Appl. No.: 09/214,450

[22] PCT Filed: Jul. 14, 1997

[86] PCT No.: PCT/DK97/00309

§ 371 Date: Dec. 29, 1998

§ 102(e) Date: Dec. 29, 1998

[87] PCT Pub. No.: WO98/02959

PCT Pub. Date: Jan. 22, 1998

[30] Foreign Application Priority Data

Jul. 16, 1996 [DE] Germany .................. 196 28 585

[51] Int. Cl.[7] ................................................ H02K 23/00
[52] U.S. Cl. .................... 318/254; 318/138; 318/439; 318/727; 318/801; 318/812; 318/799; 318/800
[58] Field of Search ................................ 318/254, 138, 318/439, 727, 801, 812, 799, 800

[56] References Cited

U.S. PATENT DOCUMENTS 5,465,210  11/1995  Walenty .................. 364/424.05
5,600,575  2/1997  Anticole ........................ 364/557

*Primary Examiner*—Karen Masih
*Attorney, Agent, or Firm*—Lee, Mann, Smith, McWilliams, Sweeney & Ohlson

[57] ABSTRACT

Method for commutation of a brushless motor being supplied with electrical energy from a DC intermediary circuit via a multi-phase inverter, by which a first current and a second current value are determined and the length of a commutation interval is set in dependence of these current values. With motors being exposed to heavily varying load torques during one rotation, e.g. motors driving a compressor, a stable operation must be reached. For this purpose a correction value is added to the pre-set commutation interval determined by the speed of the motor, said correction value being the result of the difference of the actual value of the intermediary circuit current and a filtered and delayed value of the intermediary circuit current, multiplied by a weighting factor.

14 Claims, 3 Drawing Sheets

METHOD FOR COMMUTATING A BRUSHLESS MOTOR AND POWER SUPPLY FOR A BRUSHLESS MOTOR

BACKGROUND OF THE INVENTION

The invention concerns a method for commutating a brushless motor, supplied with electrical energy from a DC intermediary circuit via a multi-phase inverter, by which a first current value and a second current value are determined, and the duration of a commutation interval is set in dependence of these current values. Further, the invention concerns a power supply for a brushless motor, the motor being connected with a DC intermediary circuit via an inverter, comprising a control unit with an input connected to the DC intermediary circuit.

With inverter controlled motors the individual motor phases must be turned on with optimum timing. Turn on must take place in correspondence with the counter voltage or counter-electromotive force (back-EMF) produced by the rotor, so that the motor does not get out of phase or timing, i.e. jumps, or even stops. This is especially important for motors, the rotors of which are equipped with permanent magnets, as here there are no possibilities for changing the flux produced by the rotor. Thus it is known to measure the induced counter-electromotive force in the windings and to use it to control the speed and to determine the moment of commutation. Hereby a measurement of the rotor position and speed can be avoided. This sensorless control is effective, but considerable costs are implied in realising it. Normally three voltage sensors (or a number corresponding to the number of phases) are required in the motor cables, which will increase the costs for the production and operation of such a motor due to the plurality of components.

Thus, it has become widely used to avoid the position and speed feed-back, and to measure the current in the intermediary circuit instead. The motor can also be controlled by means of this information. This principle can be used for both AC and three-phase current synchronous motors, and for brushless DC motors as well.

With brushless DC motors it is known to change the commutation time dynamically as a function of the current in the intermediary circuit. For this purpose the current is measured and converted to a processable parameter. This parameter is compared with a predetermined reference parameter. In dependence of the result of this comparison, the commutation interval is either kept constant or reduced or prolonged. Here commutation interval means the time between the individual commutations.

U.S. Pat. No. 5,420,492 describes a design, in which the commutation frequency, i.e. the frequency of commutations, is changed in dependence of the current over time, i.e. in dependence of the current waveshape profile. This current waveshape profile is compared with a pre-set profile. The contour of the current profile depends on whether the commutation time was correct, too early or too late. In the solution revealed in U.S. Pat. No. 5,420,492 the slope of the current is determined. When the moment of commutation occurs too early, i.e. is ahead of the rotor, the slope will be too flat. When the commutation occurs too late, the slope will be too steep. If the waveshape profile is not correct, the commutation interval is either reduced or prolonged, and a new test is made, until the correct profile, and thus the correct commutation interval, has been set. This is done via a change of the commutation frequency.

However, it is difficult to determine the optimum profile of the current, i.e. the optimum slope or the optimum relation between the two current values. The values can be determined empirically for the unloaded motor and then be taken from a look-up table during the operation. For a loaded motor, however, this determination is relatively difficult, as the kind and size of the load is not known. In dynamic systems with heavily varying loads, a correspondingly large number of reference parameters would be necessary.

This is for instance the case, when the motor is driving a compressor. In this case it is difficult to obtain an optimum control of the operation with the known method.

Piston compressors are for example used in refrigeration systems, in which they drive a refrigerant gas through a capacitor and an evaporator. Here the load torque is varying over a cycle, i.e. over a piston stroke. A typical load curve starts in the lower dead point with a small torque of approximately 0 Nm. The closer the piston comes to the upper dead point, the faster the torque increases. In most cases this increase is not linear. The outlet valve of the compressor opens in the range of the upper dead point, or somewhat earlier, e.g. at 150°. The load torque then decreases very rapidly and steeply. Normally this load-torque-decrease is not linear either.

When a speed control is not used, the motor speed changes during the load changes. This involves the risk that the motor runs very irregularly and that the rotor looses its synchronisation with the rotary field produced by the inverter and stops or jumps.

From P. S. Frederiksen et al. "Comparison of two energy optimising techniques for PM-machines", Ålborg University 1994, it is known to measure the amplitude of the intermediary circuit current, and from this derive information for the stabilisation and prevention of oscillations in the rotational speed. In this connection a first proposal is based on the fact that the medium value of the intermediary circuit current in a stationary operation point is minimised and the impressed stator voltage is set so that a power minimum is reached. The second proposal controls a phase modulated machine in dependence of the profile of the intermediary circuit current, which depends on the power factor. Also in this case the stator voltage of the phase modulated machine is set so that an optimum power factor and efficiency are reached. This solution is made so that the measured intermediary circuit current is led through an analogue low frequency filter to remove the harmonic components. However, this means that the solution is not suited for the control of a compressor, as the intermediary circuit current changes heavily during a working cycle of the compressor, and the sensed currents do not give the true picture of the load of the motor. Further, Frederiksen et al. are sampling the intermediary circuit current with a fixed frequency and independently of the phase angle of the motor voltage.

SUMMARY OF THE INVENTION

The task of the invention is to create a stable operation of motors with unequal loads.

In a method as described in the introduction, this task is solved in that a correction value is added to a given commutation interval determined by the speed of the motor, said correction value resulting from the difference between the actual value of the intermediary circuit current and a filtered, time delayed value of the intermediary circuit current, the difference being multiplied by a weighting factor, and that the actual value of the intermediary circuit current is determined at a predetermined time during the commutation interval.

Thus the information contained in both current values are immediately used to change the commutation interval, as the load of the motor is immediately expressed in a change of the intermediary circuit current. When the load increases, the intermediary circuit current increases correspondingly. The commutation interval must be changed simultaneously. It has been found that the required change of the commutation interval is approximately proportional to the difference between the two current values, provided that the current values are not used immediately, but only after a filtering of at least the delayed, i.e. the previous, current value. The term "filtering" can also be understood as the formation of a mean value. Thus the monitoring is not limited to a current waveshape profile. On the contrary, the overall current increase and decrease occurring on load changes of the motor are evaluated to determine the commutation interval. As, in fact, the commutation interval is determined on the basis of the speed of the motor, which can be pre-set, the result of the proposed method is that the changes will always be close to this pre-set reference value. Thus there will be no "wild" changes of the commutation intervals. On the contrary, the commutation interval corresponding to the speed will only be slightly increased or decreased, as required by the load. Thus the sampling is load dependent.

In a preferred embodiment the weighting factor is chosen in dependence of the speed. Thus it can be assumed that the weighting factor is reversely proportional to the speed, i.e. the higher the speed, the lower the weighting factor. Thus it is taken into consideration that with higher speeds the commutation intervals/times are reduced correspondingly. Here the speed is the desired speed or reference speed.

Preferably, the actual or instantaneous value of the intermediary circuit current is determined at least once per commutation interval and no earlier than in the middle of this commutation interval. The actual value of the intermediary circuit current is not submitted to filtering. Thus, it also changes rather markedly within a commutation interval. At the beginning of a commutation interval the current is small and then it increases. Awaiting the end of this increase, which will with sufficient certainty be finished in the middle of a commutation interval, a statement of the "real" current value in this commutation interval is obtained.

Preferably the inverter is block commutated. The block commutation means that the inverter is operated with a constant duty ratio. This means that the current in the intermediary circuit corresponds approximately to the current through the individual phases, i.e. the individual phases are not modulated in the meantime.

Alternatively, a pulse width modulation (PWM) of the inverter is possible. However, this requires a synchronisation between the DC current samplings and the turn-on times of the individual switches in the inverter.

Advantageously a brushless DC motor is used as motor. Such a motor has for instance a rotor with magnets on the surface, which produce a trapezoidal counter-electromotive force.

In an alternative embodiment it can be provided that the motor is a switched reluctance motor. This motor can be controlled in the same way as a brushless DC motor, as the current in the intermediary circuit is an expression of the shaft load. The currents measured in the intermediary circuit can then be used as reference values for the commutation times. When used for instance in a compressor, the reluctance motor turns out to be robust, especially with regard to temperature influences.

The task is also solved by means of a power supply as mentioned in the introduction, by which the control unit comprises a filter device filtering, delaying and inverting the intermediary circuit current, a summation point forming the difference between the filtered and delayed intermediary circuit current and the actual intermediary circuit current, a multiplier multiplying the difference by a weighting factor and another summation point in which the product of this multiplication is added as correction value to a speed dependent commutation interval, by which the output of the last summation point is connected with the inverter.

This power supply provides an easy way of subtracting the mean or filtered and time-delayed intermediary circuit current from the actual intermediary circuit current, and multiplying the resulting difference by a weighting factor. The inversion of the current creates the negative value of the current, so that the difference is obtained at the summation point. The parameter occurring in this way can be used to change the commutation interval. Therefore, this size can also be lead immediately to the inverter, without requiring further cumbersome workings or calculations.

BRIEF DESCRIPTION OF THE DRAWINGS

In the following the invention is described on the basis of a preferred embodiment. The drawings show.

DESCRIPTION OF THE PREFERRED EMBODIMENTS

Figure 1:
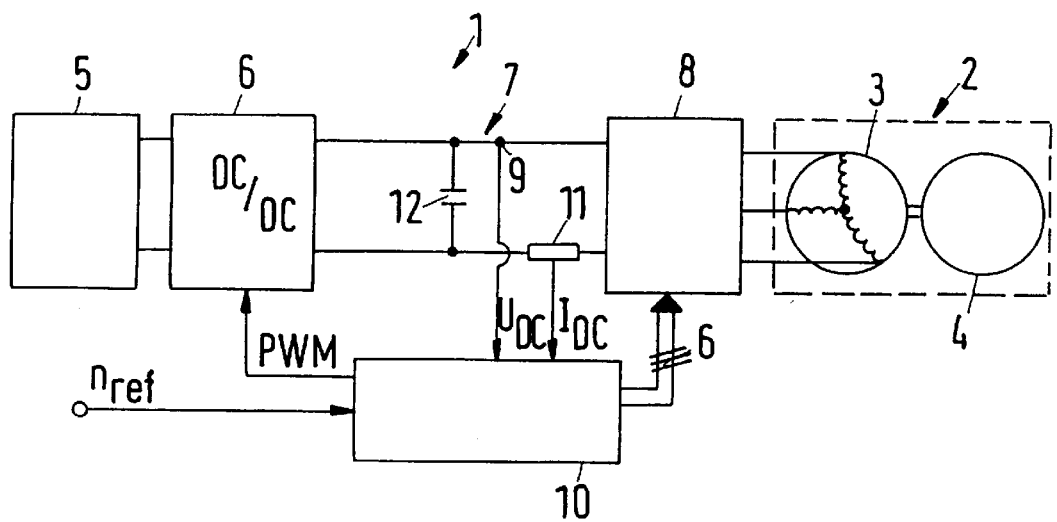
FIG. 1 a schematic block diagram of a motor control and motor

FIG. 1 shows a power supply 1 for a motor-compressor unit 2, comprising a brushless DC motor 3 and a compressor 4. The compressor is part of a not shown refrigeration system needed for the operation of an air-conditioning system in a vehicle.

The power supply 1 comprises a voltage source 5, e.g. a car battery, which is connected with a DC intermediary circuit 7 via a DC/DC voltage converter 6. The DC intermediary circuit 7 is connected with an inverter 8.

The DC/DC converter 6 is controllable. If the voltage source 5 is an AC voltage source, the DC/DC converter 6 can be replaced by a controlled rectifier.

The DC voltage supplied to the intermediary circuit 7 by the DC/DC converter 6 is collected via a pick-off or sensor 9 and supplied to an input $U_{DC}$ of a control unit 10. The DC current through the intermediary circuit is determined via a resistor 11 and also supplied to the control unit 10 via an input $I_{DC}$. For the purpose of voltage measurement, a capacitor 12 can also be arranged parallel to the output of the DC/DC converter 6.

For instance, the control unit 10 controls DC/DC converter 6 so that the power in the DC intermediary circuit 7, i.e. the product of intermediary circuit current $I_{DC}$ and intermediary circuit voltage $U_{DC}$ is minimised.

Besides, the control unit 10 produces the control impulses for the switches in the inverter 8. Hereby the inverter 8 can be block commutated, and as usual consisting of six switches and six diodes. During a commutation the switches in the inverter are active in pairs, so that the current from the intermediary circuit flows in through a first switch, then through a first motor winding of a first phase, on through a second motor winding of a second phase and out through a second switch. Each switch is closed for 120° and open for 240° (electrical degrees). In the embodiment described here a complete block commutation of the inverter 8 takes place without any modulation at all, i.e. the inverter 8 emits voltage blocks, whose amplitude corresponds to the intermediary circuit voltage $U_{DC}$.

Figure 2:
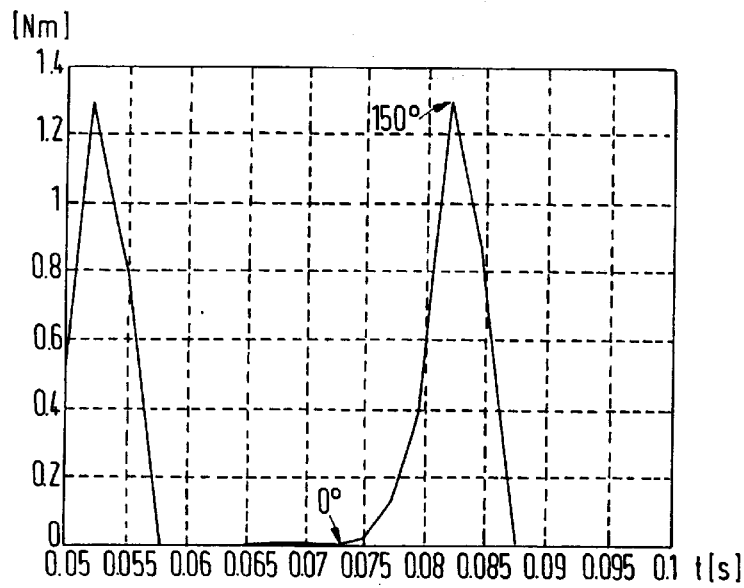
FIG. 2 a diagram of the load torque over time
Figure 4:
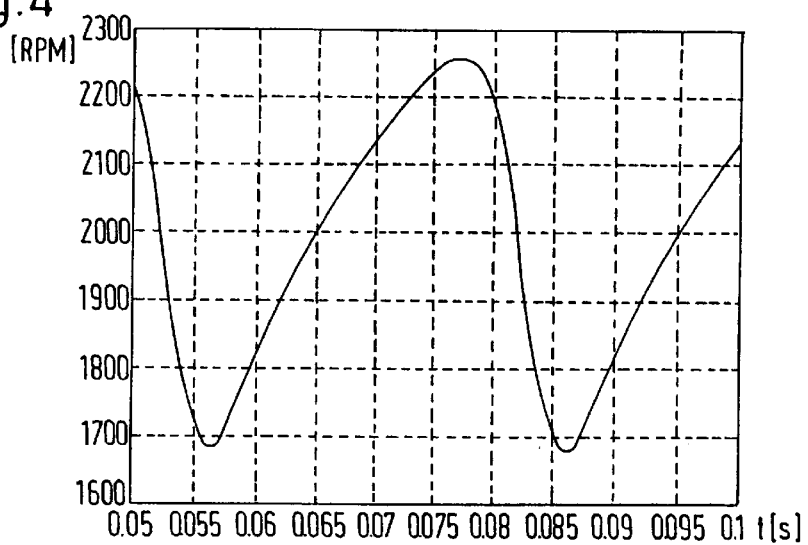
FIG. 4 a diagram of speed over the time

As the motor 3 drives a compressor 4, it has a period with a very unstable load behaviour, which appears from FIG. 2. The piston of the compressor 4 starts in the lower dead point (0°) and moves towards the upper dead point (180°), and during this movement the load torque increases quickly and unlinearily. The increase continues until the pressure valve opens, which normally happens somewhat before the upper dead point is reached, e.g. at 150°. Then the load torque decreases to the value zero again during the down-movement of the piston. As the motor 3 is operated without direct speed or position feed-back, the motor speed falls during the load rise, which can be seen from FIG. 4, which shows the motor speed with the same time scale as the one stated in FIG. 2. Thus it can be seen that the rotor changes its rotational speed during a rotation. Sometimes it rotates slower, sometimes faster, than the actually pre-set speed of 2,000 r.p.m.

On the other hand the inverter normally produces a rotary field rotating at constant angle speed, which rotary field, due to the load pattern described above, would run either ahead of or behind the rotor. This involves the risk that the rotor can no longer rotate synchronously with the rotary field causing the rotor to stop or jump. Both things are undesirable.

To remedy this problem the control unit 10 controls the inverter 8 so that the commutation intervals change within one rotation.

Figure 3:
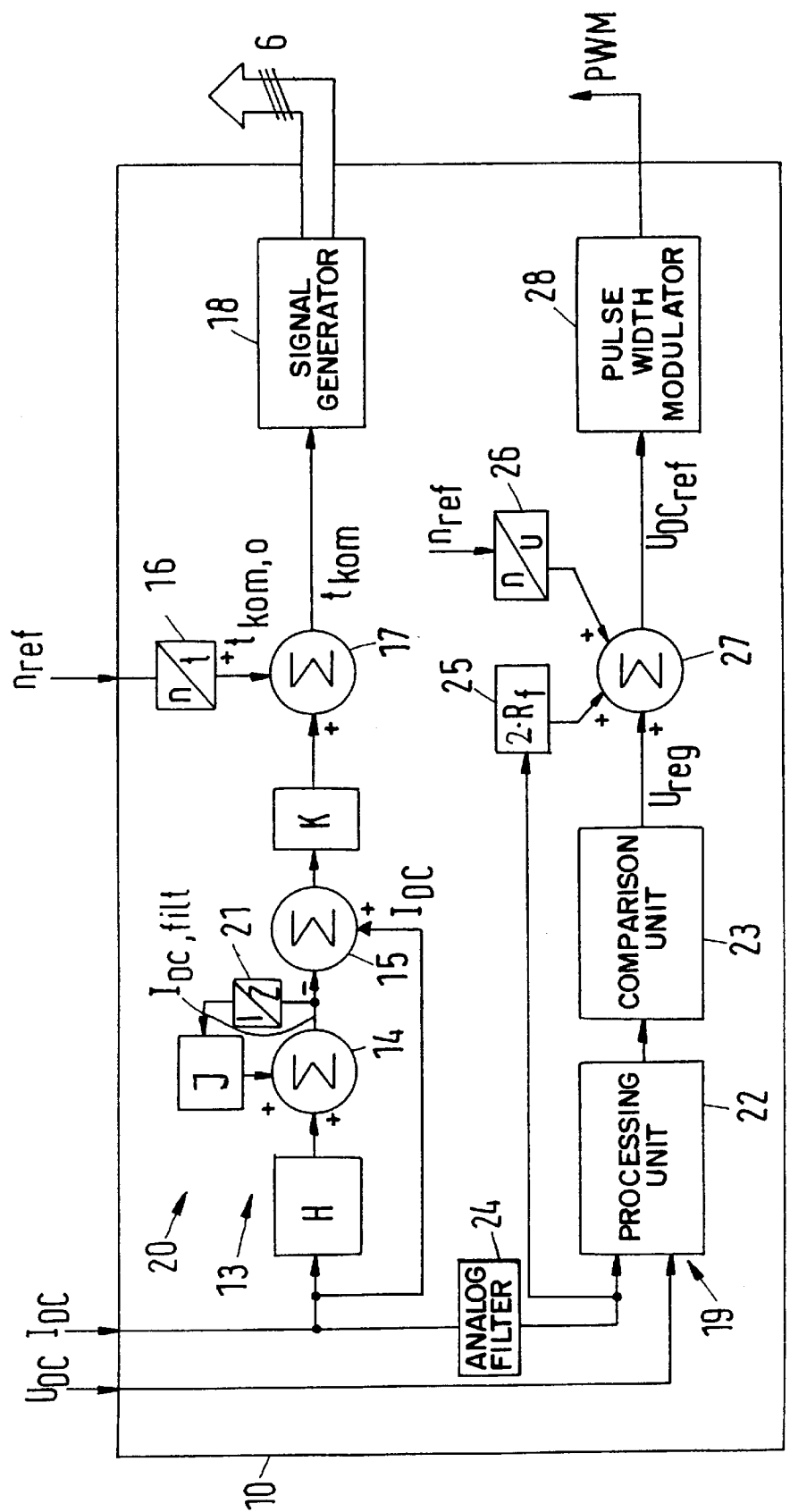
FIG. 3 a control unit in detail

The control unit 10 is shown in detail in FIG. 3. It has two branches 19, 20. The branch 20 is used for the control of the commutation times of the inverter 8. The instantaneous or actual current $I_{DC}$ measured in the resistor 11 is led through the branch 20, which comprises a digital filter 13. The branch 20 ends at a signal generator 18 supplying the commutation signals for the switches in the inverter 8. The digital filter 13 consists of the factors H, J and K. The values in this embodiment example are 0.1, 0.9 and 0.38 (ms/A), respectively. The measured current $I_{DC}$ is multiplied by the factor H (0.1) and in a summation point 14 added to a value $I_{DC,filt}$. This value $I_{DC,filt}$ is delayed in a delay link 21 and weighted with the factor J (0.9). In a summation point 15 this sum value $I_{DC,filt}=0.9\times I_{DC,filt}+0.1\ I_{DC}$ is deducted from the latest measured value of the intermediary circuit current $I_{DC}$. This difference is multiplied by the factor K (0.38). In another summation point 17 the correction contribution $K\times(I_{DC}-I_{DC,filt})$ is added to a commutation interval reference value $t_{kom0}$, which has been converted from the speed reference value $n_{ref}$ into a commutation interval in a converter 16. The sum, $t_{kom0}$, formed in the summation point 17 represents the final commutation time, which is the basis of the control of the inverter 8.

The commutation interval $t_{kom0}$ can be calculated directly on the basis of the speed. A required speed of e.g. 2000 r.p.m. and a four-pole motor results in a fundamental frequency of 66.7 Hz. With twelve commutations per rotation this gives a commutation time $t_{kom0}$ of 2.5 ms per commutation.

With an increase in the load due to the piston carrying through a compression stroke, the speed of the rotor will decrease. A relatively short commutation time of 2.5 ms as set with the pre-set speed would not justify a corresponding further rotation of the field in the stator, because the rotor has not yet come into place. When the field gets to far ahead of the rotor, there is a risk that the rotor can no longer catch up and stops.

To avoid this, the speed loss is compensated through the adding of the correction contribution mentioned above to the basic commutation interval $t_{kom0}$. For this purpose the following formula (1) is used:

$$t_{kom}=t_{kom0}+K\times(I_{DC}-I_{DC,filt}) \qquad (1)$$

This formula ensures that the commutation intervals are changed in accordance with the change of the motor load and thus also of the current in the intermediary circuit. Thus the commutation always takes place at the correct angle between the rotor and the active motor phase. The current $I_{DC}$ is the latest measured value of the intermediary circuit current, whereas $I_{DC,filt}$ is the filtered value of the intermediary circuit current from an earlier measurement.

Figure 5:
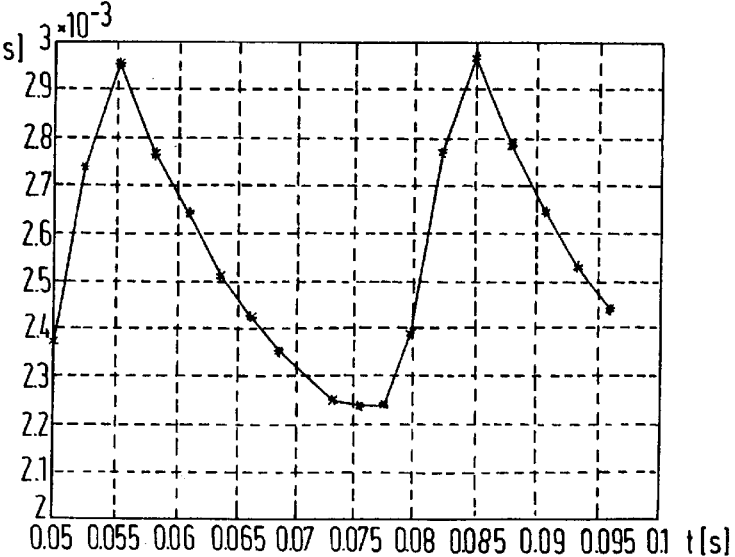
FIG. 5 the length of the commutation intervals over the time

FIG. 5 shows how the lengths of the commutation intervals change at a rotation of the rotor. FIG. 5 has the same time scale as the FIGS. 2 and 4. It is clearly seen that the commutation interval at the highest load, i.e. when the piston is at 150°, also has the longest extension, whereas the commutation interval is shortest when the motor is not loaded.

The factor K is speed dependent. In this case it has the value of 0.38 ms/A at a speed of 2,000 r.p.m. At 4,000 r.p.m. it would be 0.19 ms/A. Thus the dynamic of the stabilisation is secured at all speeds.

In the example shown here, the current $I_{DC,filt}$ has been filtered through a digital filter. However, it is also possible to use a continues arithmetic mean value formation of the current as filtering.

Preferably, the measurement of the current in the intermediary circuit takes place in the second half of a commutation period, i.e. not earlier than in the middle of a commutation period and not later than shortly before it ends. Tests have shown that this gives the most reliable result.

Figure 6:
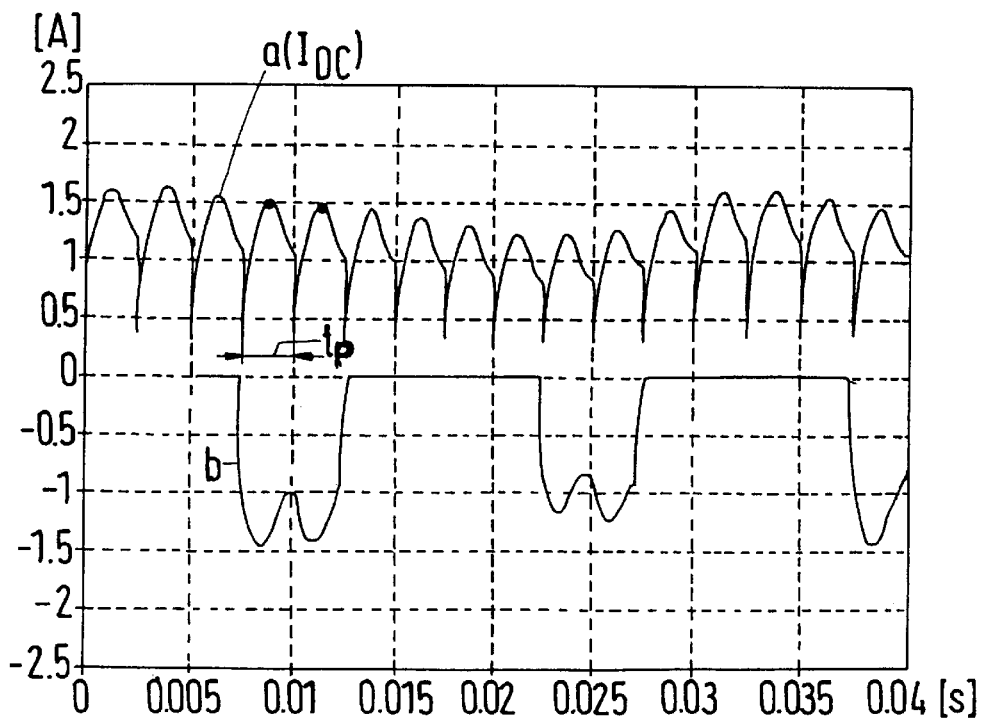
FIG. 6 the intermediary circuit current and one-phase current over the time.

With curve a, FIG. 6 shows the intermediary circuit current $I_{DC}$ with loaded motor. Curve b shows the current in one of the motor windings. As appears from curve a, the current $I_{DC}$ in the intermediary circuit does not reach its maximum until some time after the commutation. The time required by the current to reach its maximum among other things depends on when the commutation takes place, i.e. if it takes place early or late. When the commutation does not take place until the rotor has passed the stator winding in question, i.e. at a late commutation, the increase in the current is much slower. Therefore, it is important not to sample until the current has at least approximately reached its maximum value.

Therefore, the current $I_{DC}$ should not be measured until the middle of a commutation period $t_p$ has been reached, which, in this embodiment example, means about 1.25 ms after a commutation. In FIG. 6 the sampling instant is shown by means of points in two periods.

Here the measuring principle is presented with one single measurement per period. A larger number of measurements will give an improved resolution and more information about the current profile. With full block commutation, one of the phase currents to the motor is equal to the intermediary circuit current $I_{DC}$, when disregarding short discharging phenomena at turning off the current to a phase winding. The shape of the current pulses among others depends on the type of rotor used. In this example the rotor has surfacemounted permanent magnets producing a trapezoidal counter-electromotive force.

The method of commutation of a brushless DC motor described here bears the advantage that the control of the motor remains stable in spite of a very irregular type of load torque. The motor does not stop or jump. Thus the control permits an operation with improved operational reliability. Further, it is relatively inexpensive, as current measurements must only be made in the intermediary circuit. Information about rotor speed and position is not required.

In branch 19 (FIG. 3) the power minimising algorithm is carried through. The measured intermediary circuit current $I_{DC}$ is filtered in an analogue filter 24, and is led to a processing unit 22 together with the intermediary circuit voltage $U_{DC}$, in which processing unit the power consumption in the intermediary circuit is calculated on the basis of the product $I_{DC} \times U_{DC}$. In controls with fixed intermediary circuit voltage it would not be necessary to calculate the power. Here it would be sufficient to measure the intermediary circuit current and let the power minimising algorithm work on the basis of a current value. However, this is not possible here, as also the intermediary circuit voltage $U_{DC}$ is varying. In a comparison unit 23 the actual power consumption is compared with a previously measured power consumption, and the output signal is a voltage $U_{reg}$, which can be either positive or negative. $U_{reg}$ is the sum of the previous $U_{reg}$ and a control contribution $dU_{reg}$, which is in this case set fixedly at 0.25 V. By means of the contribution $dU_{reg}$ a voltage change is carried through stepwise, and for so long that a power minimum has been reached.

The voltage $U_{reg}$ is led to a summation point 27, which also receives a load dependent voltage contribution formed in a unit 25. This load dependent contribution is determined by means of the product of twice $R_f \times I_{DCF}$, the F in the index of the current meaning that this current has already passed the analogue filter 24. This contribution helps to speed up the control and normally amounts to 10 to 20% of the output value of the summation point 27. In less time critical applications this contribution can be omitted.

Further, a speed reference value is led to the summation point 27, which value is created in a unit 26 by the speed reference value $n_{ref}$. The voltage determined on the basis of this can be calculated by means of a motor constant $K_e$. The voltage determined in the unit 26 corresponds to the electromotive counter-voltage of the motor 3.

From the output of the summation point 27 a voltage $U_{DC,ref}$ is led to a pulse width modulator 28 controlling the DC/DC converter 6.

The voltage contribution $U_{reg}$ led to the summation point 27 can either increase or reduce the voltage $U_{DC,ref}$. If the actual power consumption is lower than the previously measured power consumption after a reduction of the intermediary circuit voltage, the sign of the control contribution $dU_{reg}$ is maintained, i.e. the intermediary circuit voltage is reduced by another step, and this loop is passed until an increase in the power consumption occurs. Then the control contribution $dU_{reg}$ will change its sign.

The reference voltage of the intermediary circuit is thus expressed by means of the following formula (2):

$$U_{DC,ref} = 2 \times R_f \times I_{DCF} + n_{ref} \times K_e + U_{reg} \quad (2)$$

whereby:

$U_{DC,ref}$ is the reference value of the intermediary circuit voltage $R_f$ is the winding resistance per phase $I_{DCF}$ is the filtered intermediary circuit current $n_{ref}$ is the desired rotational speed of the motor $K_e$ is the electromotive force (EMF) constant of the motor $U_{reg}$ is the calculated voltage contribution If the voltage is supplied by a 12 V battery, e.g. in a vehicle, the DC regulating unit 6 can be a boost converter with one single switch, said converter being pulse width modulated. As, in relation to the pulse width modulation of the six switches in the inverter 8, only one switch is pulse width modulated in the DC/DC converter, the switch losses are considerably reduced. Further, this will reduce the heat development and thus the need for cooling.

I claim:

1. Method for commutation of a brushless motor supplied with electrical energy from a DC intermediary circuit via a multiphase inverter, comprising the steps of determining a first current value and a second current value, setting the duration of a commutation interval in dependence of the current values, and adding a correction value to the commutation interval determined by the speed of the motor, said correction value being determined from computing the difference between an actual value of the intermediary circuit current and a filtered, time delayed value of the intermediary circuit current and multiplying the difference by a weighting factor, and in which the moment of the actual value of the intermediate current is selected in dependence of the load on the motor.

2. Method according to claim 1, in which the load of the motor is expressed in terms of a commutation interval, whereby the moment of sampling is calculated as a function of said commutation interval.

3. Method according to claim 1, in which the actual value of the intermediary circuit current is determined at least once per commutation interval and no earlier than in the middle of the commutation interval.

4. Method according to claim 2, in which the actual value of the intermediary circuit current is determined at least once per commutation interval and no earlier than in the middle of the commutation interval.

5. Method according to claim 1, in which the weighting factor is selected in dependence of the speed.

6. Method according to claim 1, in which the inverter is block commutated.

7. Method according to claim 1, in which the inverter is pulse width modulated.

8. Method according to claim 1, in which the motor is a brushless DC motor.

9. Method according to claim 1, in which the motor is a switched reluctance motor.

10. Power supply for a brushless motor, said motor being connected with a DC intermediary circuit via an inverter, comprising a control unit with an input connected to the DC intermediary circuit, the control unit comprising a filter device filtering, delaying and inverting the intermediary circuit current, a first summation point forming the difference between the filtered and delayed intermediary circuit current and the actual intermediary circuit current, a multiplier multiplying the difference by a weighting factor and a second summation point in which the product of the multiplier is added as correction value for a speed dependent commutation interval, the output of the second summation point being connected with the inverter.

11. A power supply according to claim 10, in which the inverter is block commutated.

12. A power supply according to claim 10, in which the inverter is pulse width modulated.

13. A power supply according to claim 10, in which the motor is a brushless DC motor.

14. A power supply according to claim 10, in which the motor is a switched reluctance motor.

* * * * *